United States Patent
Hirano

(10) Patent No.: US 11,201,822 B2
(45) Date of Patent: Dec. 14, 2021

(54) SWITCH, SWITCH CONTROLLING METHOD, AND PROGRAM

(71) Applicant: NEC Corporation, Tokyo (JP)

(72) Inventor: Naoki Hirano, Tokyo (JP)

(73) Assignee: NEC CORPORATION, Tokyo (JP)

(*) Notice: Subject to any disclaimer, the term of this patent is extended or adjusted under 35 U.S.C. 154(b) by 107 days.

(21) Appl. No.: 16/485,479

(22) PCT Filed: Feb. 20, 2018

(86) PCT No.: PCT/JP2018/005893
§ 371 (c)(1),
(2) Date: Aug. 13, 2019

(87) PCT Pub. No.: WO2018/155409
PCT Pub. Date: Aug. 30, 2018

(65) Prior Publication Data
US 2019/0363987 A1    Nov. 28, 2019

(30) Foreign Application Priority Data

Feb. 21, 2017   (JP) ............................... JP2017-030271

(51) Int. Cl.
*H04L 12/801* (2013.01)
*H04L 12/835* (2013.01)
(Continued)

(52) U.S. Cl.
CPC ............ *H04L 47/115* (2013.01); *H04L 47/30* (2013.01); *H04L 47/32* (2013.01); *H04L 49/103* (2013.01)

(58) Field of Classification Search
CPC ....... H04L 47/115; H04L 47/30; H04L 47/32; H04L 49/103
See application file for complete search history.

(56) References Cited

U.S. PATENT DOCUMENTS 5,457,687 A * 10/1995 Newman ............. H04L 12/5602
370/232
6,144,636 A * 11/2000 Aimoto ................... H04L 47/10
370/229

(Continued)

FOREIGN PATENT DOCUMENTS

JP          S58-13048 A     1/1983
JP          H10-276224 A   10/1998

(Continued)

OTHER PUBLICATIONS

International Search Report for PCT Application No. PCT/JP2018/005893, dated May 15, 2018.

*Primary Examiner* — Hassan Kizou
*Assistant Examiner* — Hector Reyes
(74) *Attorney, Agent, or Firm* — Sughrue Mion, PLLC

(57) ABSTRACT

A switch has a determining section and a memory managing section. The determining section determines whether or not the node is in a non-ordinary state in which received packets cannot be successfully processed, on a basis of a determination whether or not congestion notification packets received from a node have been continuously received during at least a given period and a determination whether or not a quantity of memory used in a buffer memory which accumulates received packets is at least a given value. The memory managing section deletes, in a case where the node is determined to be in the non-ordinary state, data addressed to the node in the non-ordinary state among data accumulated in the buffer memory.

10 Claims, 4 Drawing Sheets

(51) Int. Cl.
*H04L 12/823* (2013.01)
*H04L 12/933* (2013.01)

(56) References Cited

U.S. PATENT DOCUMENTS

| | | | |
|---|---|---|---|
| 6,170,022 | B1 | 1/2001 | Linville et al. |
| 6,741,555 | B1 * | 5/2004 | Li .................. H04L 47/10 |
| | | | 370/229 |
| 7,369,498 | B1 * | 5/2008 | Ma .................. H04L 47/10 |
| | | | 370/235 |
| 7,830,801 | B2 * | 11/2010 | Kwan .............. H04L 47/10 |
| | | | 370/235 |
| 8,121,038 | B2 * | 2/2012 | Bergamasco ........ H04L 47/263 |
| | | | 370/236 |
| 8,693,320 | B2 * | 4/2014 | Furbeck .............. H04L 47/263 |
| | | | 370/229 |
| 2014/0192646 | A1 * | 7/2014 | Mir .................. H04L 47/12 |
| | | | 370/235 |
| 2015/0244639 | A1 * | 8/2015 | Iordache ............ H04L 47/2441 |
| | | | 370/230 |
| 2015/0257035 | A1 * | 9/2015 | Grinshpun ........ H04W 28/0284 |
| | | | 370/235 |

FOREIGN PATENT DOCUMENTS

| | | | |
|---|---|---|---|
| JP | H11-55304 | A | 2/1999 |
| JP | 2000-036839 | A | 2/2000 |
| JP | 2000-209250 | A | 7/2000 |
| JP | 2002-223223 | A | 8/2002 |
| JP | 2002-261766 | A | 9/2002 |
| JP | 2002-314562 | A | 10/2002 |
| JP | 2003-008628 | A | 1/2003 |
| JP | 2004-289744 | A | 10/2004 |
| JP | 2004289744 | A * | 10/2004 |
| JP | 2007-174152 | A | 7/2007 |
| JP | 2008-054199 | A | 3/2008 |
| JP | 2009-077270 | A | 4/2009 |
| JP | 2012-244348 | A | 12/2012 |
| JP | 2015-185054 | A | 10/2015 |
| JP | 2016-208097 | A | 12/2016 |

* cited by examiner

SWITCH, SWITCH CONTROLLING METHOD, AND PROGRAM

TECHNICAL FIELD

Disclosure About Related Application

This application is a National Stage Entry of PCT/JP2018/005893 filed on Feb. 20, 2018, which claims priority from Japanese Patent Application 2017-030271 filed on Feb. 21, 2017, the contents of all of which are incorporated herein by reference, in their entirety.

The present invention is related to a switch, a switch controlling method and a program. In particular, the present invention is related to a switch, a switch controlling method and a program used in a network system.

BACKGROUND

In many cases, a network switch adopts a method of accumulating received data in a shared buffer memory, verifying destinations of the received packets and then transferring data to each transmission port.

Here is considered a situation in which congestions or failures have occurred in a specific node which is a destination of packets. When such a situation occurs, a state may occur in which it is impossible to transmit data to the specific node from a network switch. If such state continues and yet more if communication load increases in other nodes, a capacity of the shared buffer memory of the network switch may become insufficient and it may become impossible to receive data (packets) addressed to a node in which no problem is occurring (a node other than nodes in which congestions or failures is occurring). That is, congestions or the like which have occurred in a node of destination may affect communication in all nodes connected to the network switch.

The techniques disclosed in patent literatures 1 to 8 aim to solve above-mentioned problems. For example, it is disclosed in the patent literature 1 that: a multiport switch 1-10 accumulates data frames inputted from each of ports P1, P2 and Pn in a shared buffer memory 1-14 and then sends to ports addressed to an opposing station which is the destination; when receiving a PAUSE frame, due to receive queue congestion in the opposing station 1-22, from the station 1-22, the multiport switch 1-10 stops sending the data frames to the port P2 of the station 1-22; then, the multiport switch 1-10 identifies data frames addressed to ports of the station 1-22 among data frames inputted from each of other ports, by referring MAC (Media Access Control) address table 1-13, and discards the data frames.

[PTL 1] Japanese Patent Application Publication No. JP2004-289744A
[PTL 2] Japanese Patent Application Publication No. JP2002-223223A
[PTL 3] Japanese Patent Application Publication No. JP2002-314562A
[PTL 4] Japanese Patent Application Publication No. JP2002-261766A
[PTL 5] Japanese Patent Application Publication No. JP2000-036839A
[PTL 6] Japanese Patent Application Publication No. JP2000-209250A
[PTL 7] Japanese Patent Application Publication No. JPH11-055304A
[PTL 8] Japanese Patent Application Publication No. JPH10-276224A

SUMMARY

It should be noted that each disclosure of the above-mentioned prior art documents is incorporated by reference in the present disclosure. The following analysis has been performed by the inventors of the present invention.

In the techniques disclosed in patent literatures 1 to 8, a transmission addressed to a specific node, in which a congestion is occurring, is suppressed. If the specific node is in a congestion state, this specific node returns to a state of ordinary operation and becomes able to receive data from the network switch. However, if the specific node is in a state of failure, it is conceivable that the above-mentioned operation (stopping packet transmission to the node in failure) continues until the failure is repaired (or until replacing the node in failure). As a result, in a case where stagnation of data addressed to the node in failure in the shared buffer memory in the network switch occurs and then other nodes fall in the congestion state, for example, it is possible that the capacity of the shared buffer memory finally runs out and communications of all the nodes connected to the network is affected.

For example, when considering about hardware which configures a node, a HDD (Hard Disk Drive) is configured with wearing members, in contrast with a CPU (Central Processing Unit), memory, LAN (Local Area Network) controller or the like, and may break down earlier than other hardware. As a result, it occurs a situation in which the LAN controller is ordinarily operating while the HDD is in failure, and it occurs a situation in which data can be received but cannot be written.

It has actually occurred a case where, in such a situation, the LAN controller continued sending pause frames or the like, while sending the pause frames (pause packets) affected communication of whole nodes connected to the same network as the node in failure. That is, when a specific node is fallen in a state in which the LAN controller is ordinarily operating while the HDD is in failure and the specific node receives data but cannot write it in the HDD, then the effect of the techniques disclosed in patent literatures 1 to 8 (suppressing data transmission addressed to a specific node in which congestion is occurring) cannot be expected.

That is, when data transmission from a network switch to a node in failure becomes unable during a long period of time until replacement for failure performed, data addressed to the node in failure continue stagnating in the shared buffer memory in the network switch. When in such a situation another communication node falls in a congestion state, the capacity of the shared buffer memory of the network switch becomes insufficient, data become unable to be received and as a result, communications in nodes at low load may be affected.

The present invention aims to provide a switch, a switch controlling method and a program which enable a stable network operation even in a case, not only of node congestion, but also of node failure.

In accordance with a first aspect of the present invention, there is provided a switch having a determining section, configured to determine whether or not the node is in a non-ordinary state in which received packets cannot be successfully processed, on a basis of a determination whether or not congestion notification packets received from a node have been continuously received during at least a given period and a determination whether or not a quantity of memory used in a buffer memory which accumulates received packets is at least a given value, and a memory managing section, configured to delete, in a case where the node is determined to be in the non-ordinary state, data addressed to the node in the non-ordinary state among data accumulated in the buffer memory.

In accordance with a second aspect of the present invention, there is provided a switch controlling method comprising: determining whether or not the node is in a non-ordinary state in which received packets cannot be successfully processed, on a basis of a determination whether or not congestion notification packets received from a node have been continuously received during at least a given period and a determination whether or not a quantity of memory used in a buffer memory which accumulates received packets is at least a given value; and deleting, in a case where the node is determined to be in the non-ordinary state, data addressed to the node in the non-ordinary state among data accumulated in the buffer memory.

In accordance with a third aspect of the present invention, there is provided a program which makes a computer equipped in a switch to execute a process of determining whether or not the node is in a non-ordinary state in which received packets cannot be successfully processed, on a basis of a determination whether or not congestion notification packets received from a node have been continuously received during a at least a given period and a determination whether or not a quantity of memory used in a buffer memory which accumulates received packets is at least a given value, and a process of deleting, in a case where the node is determined to be in the non-ordinary state, data addressed to the node in the non-ordinary state among data accumulated in the buffer memory.

It should be noted that this program can be recorded in a computer-readable storage medium. The storage medium may be a non-transient one, such as a semiconductor memory, a hard disk drive, a magnetic storage medium, an optical storage medium. The present invention can be implemented as a computer program product.

According to each aspect of the present invention, there is provided a switch, a switch controlling method and a program which contribute to enable a stable network operation even in a case, not only of node congestion, but also of node failure.

It is a drawing to explain an overview of an exemplary embodiment.

FIG. 2

It is a drawing showing an example of configuration of a network system
related to a first exemplary embodiment.

FIG. 3

It is a drawing showing an example of internal configuration of a network
switch related to a first exemplary embodiment.

FIG. 4

It is a flowchart showing an example of operation of a network switch related to a first exemplary embodiment.

PREFERRED MODES

Firstly, an overview of an exemplary embodiment will be explained. It should be noted that drawing reference signs appended in this overview are appended to each element for convenience as an example to help understanding and the description of this overview does not intend any limitation.

Figure 1:
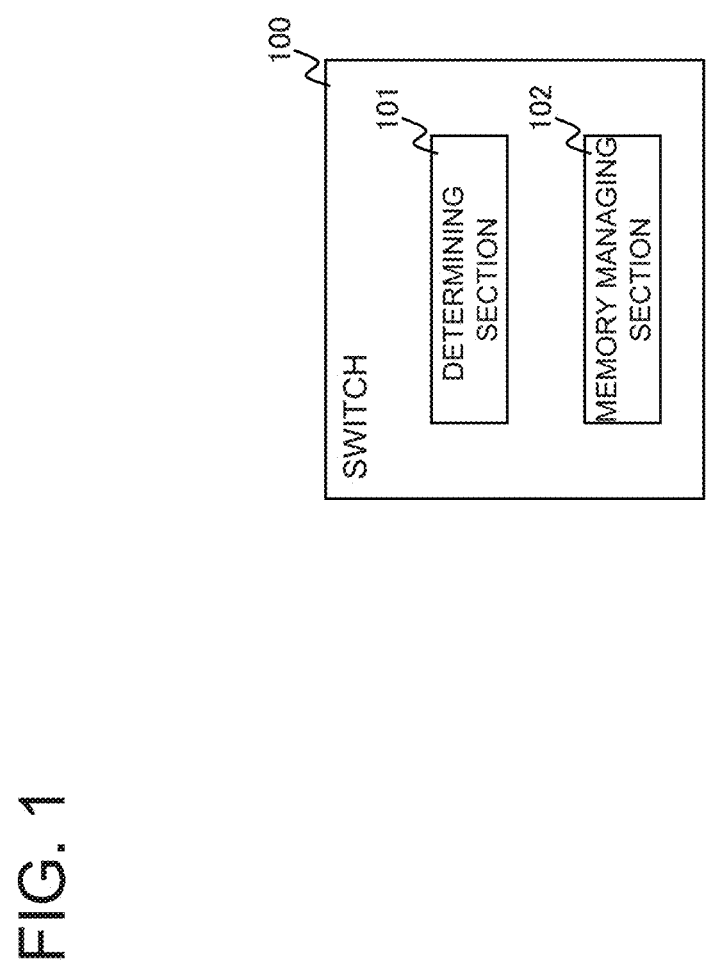
FIG. 1

A switch 100 related to an exemplary embodiment has a determining section 101 and a memory managing section 102 (cf. FIG. 1). The determining section 101 determines whether or not the node is in a non-ordinary state in which received packets cannot be successfully processed, in accordance with a determination whether or not congestion notification packets received from a node have been continuously received during at least a given period and a determination whether or not a quantity of memory used in a buffer memory which accumulates received packets is at least a given value. The memory managing section 102 deletes, in a case where the node is determined to be in the non-ordinary state, data addressed to the node in the non-ordinary state among data accumulated in the buffer memory.

The above-mentioned switch 100 determines whether or not the state in which data (received packets) cannot be successfully processed (non-ordinary state) due to congestions or failure state is continuing in a specific node (node which receives packets) to which packets are transmitted from the switch. In a case where the node is determined to be in the non-ordinary state, the switch 100 deletes data addressed to a port to which the node is connected, from the buffer. By deleting (discarding) data addressed to a node in a non-ordinary state, from the buffer memory, a margin occurs in the buffer memory to store packets addressed to other ordinarily operating nodes. As a result, a node in a non-ordinary state (for example, a node in failure) does not affect a communication to an ordinarily operating node (node of a low load) anymore. That is, a stable network operation becomes possible even in a case of node failure.

In addition, by realizing functions of the above-mentioned switch 100 by a program stored in a HDD or the like (network switch load reducing program), it becomes possible to set threshold values appropriate for each switch in an above-mentioned couple of determinations, and it becomes possible to flexibly respond in accordance with specifications of a system or a switch.

By referring to drawings, a specific exemplary embodiment will be explained in more detail, as following. It should be noted that, in each exemplary embodiment, a same component is applied with a same sign and the explanation thereof will be omitted. In addition, a connection line between blocks in each drawing includes both of bidirectional line and unidirectional line. An unidirectional arrow schematically shows a flow of a main signal (data) and does not exclude its bi-directionality. Further, although explicit illustration is omitted, input ports and output ports exist at each of input end and output end of each connection line in circuit diagram, a block diagram, an internal configuration diagram, connection diagram or the like shown in the disclosure of the present invention. The same applies to input and output interfaces.

First Exemplary Embodiment

A first exemplary embodiment will be described in more detail by use of drawings.

Figure 2:
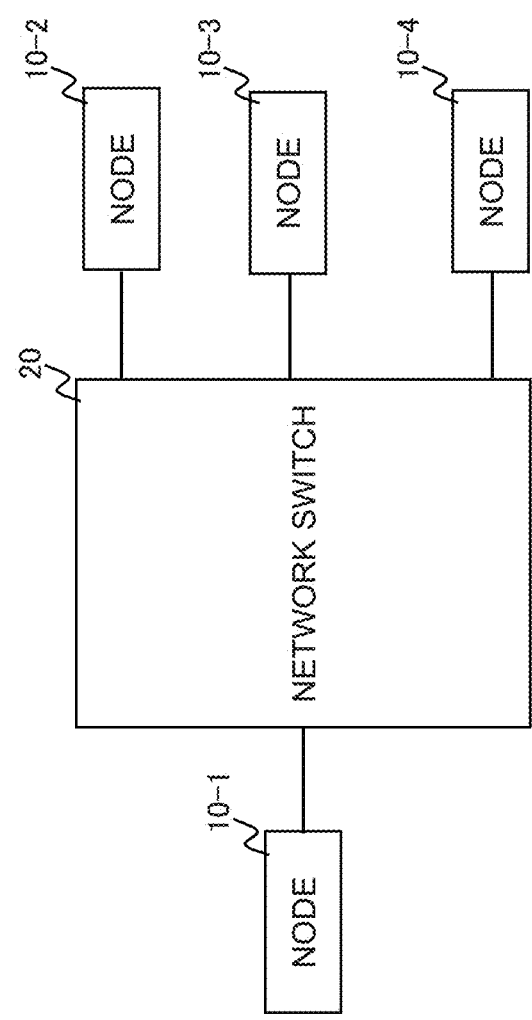

FIG. 2 is a drawing showing an example of configuration of a network system related to a first exemplary embodiment. According to FIG. 2, the network system is configured by including a plurality of nodes 10-1 to 10-4 and a network switch 20.

It should be noted that, in following explanation, nodes 10-1 to 10-4 will be simply noted "node(s) 10" when there is no particular reason to differentiate those nodes. In addition, while FIG. 2 shows 4 nodes, there is no purpose to limit the number of nodes.

The nodes 10 and the network switch 20 are connected via LAN cables or the like. In addition, each of the nodes 10 can mutually communicate via the network switch 20.

Figure 3:
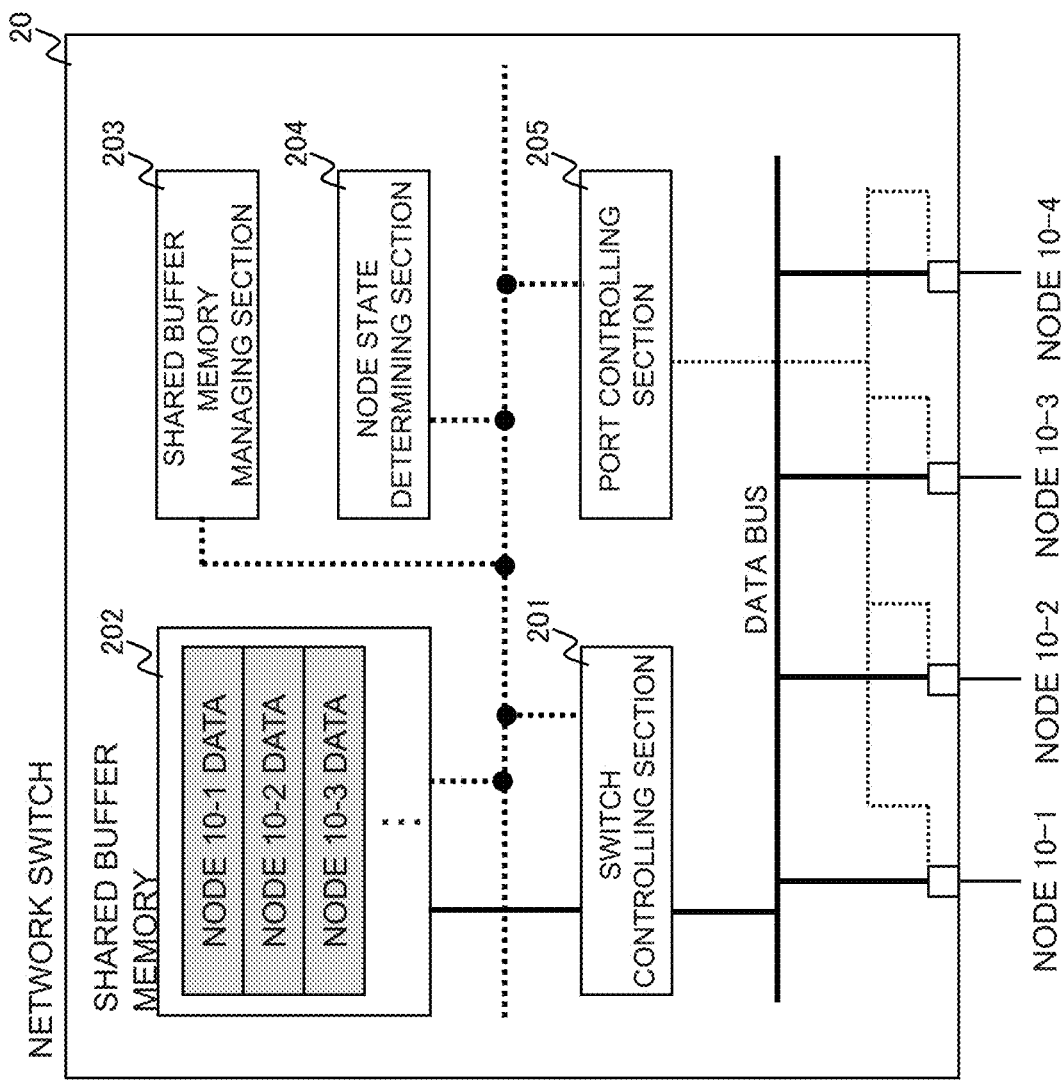

FIG. 3 is a drawing showing an example of internal configuration of a network switch 20 related to a first exemplary embodiment. According to FIG. 3, the network switch 20 is configured by including a switch controlling section 201, a shared buffer memory 202, a shared buffer memory managing section 203, a node state determining section 204 and a port controlling section 205.

Each port of the network switch 20 is connected with the shared buffer memory 202 via the switch managing section 201. In addition, each processing module, which configures the network switch 20, is connected by control lines or the like and is configured to be able to mutually send and receive information.

It should be noted that at least the node state determining section 204 and the port controlling section 205 can be realized by firmware. That is, the whole functions or a part of functions of the network switch 20 is realized by execution of a program stored in a storage medium, such as a HDD, by a CPU (not illustrated). In addition, this program can be updated by downloading via a network or by using a storage medium in which the program is stored. Further, the node state determining section 204 or the like can be realized by a semiconductor chip (for example, a microprocessor).

The switch controlling section 201 is a means to realize a packet transfer by the network switch 20. Specifically, the switch controlling section 201 acquires a received packet from a port connected to each node 10. The switch controlling section 201 analyzes header information of the received packet and determines a source of the received packet. The switch controlling section 201 learns a relationship between a MAC (Media Access Control) address of the determined source and the receiving port (i.e., to create and update a MAC address table).

The switch controlling section 201 stores the received packet(s) in the shared buffer memory 202. More precisely, the switch controlling section 201 instructs the shared buffer memory managing section 203, which manages and controls the shared buffer memory 202, to store the above-mentioned received packet(s).

In addition, the switch controlling section 201 delivers (transfers) the received packet(s) to the node state determining section 204. Further, while receiving pause packet(s) from a node 10 (during a given period after receiving), the switch controlling section 201 does not transmit packets (does not send transmission packets) to the node 10 which transmits the pause packet(s). It should be noted that the pause packets correspond to the above-mentioned congestion notification packet(s).

The switch controlling section 201 reads data stored in the shared buffer memory 202 (received packets) and outputs the read packets to a port in accordance with a destination address of the data.

The shared buffer memory 202 is a means to temporarily accumulate packets received from nodes 10. The shared buffer memory 202 is a buffer memory to accumulate packets received at each of the plurality of ports.

The shared buffer memory managing section 203 corresponds to a memory controller which manages and controls the shared buffer memory 202. The shared buffer memory managing section 203 is a means to delete data addressed (destined) to nodes in a non-ordinary state among data accumulated in the shared buffer memory 202 in accordance with a result of a determination by the node state determining section 204 as described below.

The node state determining section 204 is a means to perform a determination whether or not pause packets (congestion notification packets) received from a node 10 have been continuously received during a given period or longer (i.e., during at least a given period) and a determination whether or not a quantity of memory used in a buffer memory 202 which accumulates received packets is a given value or greater (i.e., at least a given value). The node state determining section 204 determines, in accordance with those two determinations, whether or not the node 10 is in a non-ordinary state in which received packets cannot be successfully processed.

Specifically, the node state determining section 204 monitors pause packet(s) reception from each node 10. Further, the node state determining section 204 determines whether or not a node 10 is fallen into a state in which a received packet cannot be successfully processed, such as in a case where the node 10 is in an extreme congestion state or a case where the node 10 is in failure, or the like. Thus, the node state determining section 204 performs a two-step determination process related to pause packets transmitted by this node 10 to determine whether or not the node 10 which transmitted pause packets is in a non-ordinary state.

The port controlling section 205 is a means to operate a port in accordance with a result of a determination by the node state determining section 204. Specifically, the port controlling section 205 sets the port, which is connected to the node 10 in the non-ordinary state, into a link-down state.

(Explanation of Operation)

Figure 4:
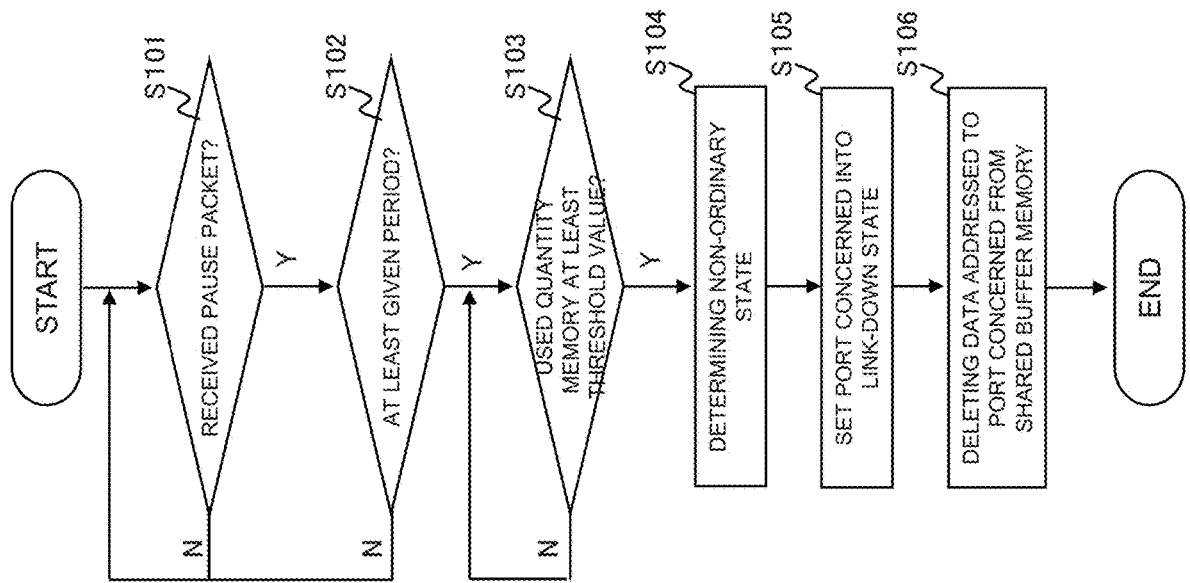

Next, by referring to FIG. 4, an operation of the network switch 20 in relation with the first exemplary embodiment will be explained.

In the explanation of operation, it will be considered a case where a node 10-1 transmits packets to a node 10-2 and a node 10-3. In this case, it is assumed that in the node 10-2, an internal HDD is in failure and received packets (transmitted packets) cannot be written in the node itself (own node). In addition, in this case, the node 10-2 is assumed to be transmitting pause packets to the network switch 20 in order to avoid a receive buffer overflow due to impossibility of writing received packets in the HDD of the node itself.

The node state determining section 204 determines whether or not a specific port is receiving pause packets (step S101).

If pause packets are not received (step S101, branch "NO"), the node state determining section 204 monitors pause packet reception in each port (repeating step S101 process).

In a case where pause packets are received (step S101, branch "YES"), the node state determining section 204 determines whether or not the pause packet reception is continuing during a given period or longer (i.e., at least a given period) (step S102).

In the above-mentioned situation, the process transits to the step S102, because pause packets are received at the port to which the node 10-2 is connected.

If pause packet reception period is shorter than the given period (step S102, branch "NO"), the node state determining section 204 determines that the pause packet reception is due to a temporary congestion in the node 10 and returns the process to the step S101.

In a case where the pause packet reception is continuing during at least a given period (step S102, branch "YES"), the node state determining section 204 executes a determination process in step S103.

In the above-mentioned situation, the HDD in the node 10-2 is in failure and the node state determining section 204 is to determine that pause packets are received during at least a given period. Therefore, the process transits to step S103.

In step S103, the node state determining section 204 determines whether or not a quantity of memory consumed in the shared buffer memory 202 is at least a given value (threshold value). Specifically, the node state determining section 204 acquires the quantity of memory consumed in the shared buffer memory 202 from the shared buffer memory managing section 203 and applies a threshold processing to the acquired quantity of consumed memory.

If the quantity of consumed memory is less than a threshold value (step S103, branch "NO"), the node state determining section 204 repeats the step S103 process. That is, while there is a margin in a free space of the shared buffer memory 202, the node state determining section 204 does not execute final determination on the state of the node 10. That is, in a case where a space is available in the shared buffer memory 202, the node state determining section 204 expects a return of the node 10, supposed to be in failure (node 10-2 in the above-mentioned example), to an ordinary state and executes the above-mentioned determination.

If the quantity of consumed memory is at least the threshold value (step S103, branch "YES"), the node state determining section 204 determines that the node 10-2 which transmits pause packets is in a non-ordinary state (step S104). In the above-mentioned situation, the node state determining section 204 finally determines that the corresponding node is a node in failure (a node in a non-ordinary state) because the node 10-2 continues transmitting pause packets.

Then, the node state determining section 204 notifies this fact to the shared buffer memory managing section 203 and the port controlling section 205.

The port controlling section 205 sets the port concerned which continuously received pause packets (the port which is determined to be connected to the node in failure) to a link-down state (step S105).

The node state determining section 204 instructs the shared buffer memory managing section 203 to delete data addressed to the node of failure (packets of which the destination is the node 10-2) from the shared buffer memory 202 (step S106). Specifically, the node state determining section 204 specifies packets of which the destination address is the address of the node of failure (node 10-2 in the above-mentioned example) as the packet(s) to be deleted, and instructs the shared buffer memory 202 to delete data (packets) having this address from the shared buffer memory 202. Alternatively, in addition to the above-mentioned deleting instruction, the node state determining section 204 may instruct the shared buffer memory managing section 203 to delete packets (received packets, pause packets), which were received from the node of failure (node 10-2 in the above-mentioned example), from the shared buffer memory 202.

When pause packets are continuously inputted, the network switch 20 becomes unable to transmit data to the node 10 which transmits the pause packets, and data (packets) addressed to the node 10 stagnate in the shared buffer memory 202. Unless any measure is taken against this situation, a situation in which packets stagnate in the shared buffer memory 202 will continue until the node 10 of failure is replaced. In such situation, if a load of communication addressed to a node 10 which is not in failure (addressed to a node 10-3 in the above-mentioned example), the capacity of the whole shared buffer memory 202 is suppressed (or squeezed). As a result, it may occur a situation in which the network switch 20 cannot receive every transmission data addressed from the transmission node (node 10-1 in the above-mentioned example) to other node(s) 10. That is, it may occur an impact such as occurring delay in communication addressed to the node 10-4 or other nodes with low load of communication.

To deal with the above-mentioned problem, the network switch 20 related to the first exemplary embodiment determines a state (ordinary state, non-ordinary state) of the node 10 in accordance with a first determination in which is determined whether or not pause packets were inputted to the (own) device itself (network switch 20) during a predetermined (fixed) period and a second determination in which is determined whether or not a quantity of memory used in the shared buffer memory 202 is at least a given value. When determining, by the above-mentioned two-step determination, that the node 10 is in a non-ordinary state, the network switch 20 deletes (discards) packet(s) addressed to this node 10 (packets of which the destination is addressed to this node 10) from the shared buffer memory 202 and sets the port addressed to this node 10 into a link-down state. That is, not only suppressing communication to specific nodes, the network switch 20 sets ports which are addressed to specific nodes into a link-down state and deletes data from the shared buffer memory 202.

As a result, not only in a case where any node is in congestion, it can avoid an impact (adverse influence) from those nodes being in failure, such as continuing transmitting pause packets because its LAN controller or the like ordinarily is operating but its HDD is in failure, so that data can be received but cannot be written in the HDD. Specifically, it can prevent an impact to communications between ordinarily operating nodes caused by the shared buffer memory 202 of the network switch 20 being occupied due to an impact from the above-mentioned node in failure.

It should be noted that it is desirable to set appropriated values to the system as threshold values related to node state determination (threshold value of pause packets continuing period, threshold value of switch output buffer). That is, as described above, by realizing functions of the network switch 20 by programs (firmware stored in the HDD or the like), appropriated threshold values can be set in each system in which the network switch 20 is used. In addition, modifications of those threshold values can be easily applied to switches in operation because such modifications can also be realized by modifying programs installed in the network switch 20.

The configurations and operations of the network switch 20 as explained in the above-mentioned exemplary embodiment is examples and various modifications can be taken therein. For example, the network switch 20 may, instead of setting the port connected to the node into failure or the like in a link-down state, discard pause packets received on this port at the switch controlling section 201.

In addition, while a plurality of steps (processes) are described in order in the plurality of flowcharts used in the above-described explanations, the order of executing the steps executed in each exemplary embodiment is not limited to the order as described. In each exemplary embodiment, the order of the illustrated steps can be modified as long as their contents are not adversely affected, such as executing each process in parallel for example, or the like.

As explained above, industrial applicability of the present invention is evident: the present invention is suitably applicable to IP (Internet Protocol) telephone, mobile phone (cellphone system) or the like. That is, it is because network operation can be stably performed by adding a firmware or a microprocessor to the network switch, even in a case where a high quality is required, no maintenance personnel is resident such as in an office or the like, and installation is in a location where replacements due to failure or the like take time.

It should be noted that each disclosure of the above-described patent literatures or the like is incorporated by reference thereto in the present disclosure. Within a scope of the whole disclosure of the present invention (including claims) and in accordance with its basic technical concept, exemplary embodiments and/or examples of embodiment can be modified and/or adjusted. In addition, several combinations and/or selections among various disclosed elements (including each element of each claim, each element in each exemplary embodiment and/or example of embodiment, each element of each drawing, or the like) can be performed within the scope of the whole disclosure of the present invention. That is, the present invention naturally includes various deformations and modifications which may be performed by skilled persons in the art in accordance with the entire disclosure including claims and technical concept. Especially, numerical ranges described in the present description is to be interpreted so that any values or any subrange included in such ranges is specifically described, even if there is no explicit description.

EXPLANATION OF SIGNS 10, 10-1 to 10-4 Node
20 Network switch
100 Switch
101 Determining section
102 Memory managing section
201 Switch controlling section
202 Shared buffer memory
203 Shared buffer memory managing section
204 Node state determining section
205 Port controlling section

What is claimed is:

1. A switch comprising:
at least a processor; and
a memory in circuit communication with the processor,
wherein the processor is configured to execute program instructions stored in the memory to implement:
a determining section configured to determine whether or not a node is in a failure state in which first received packets at the node cannot be successfully processed, on a basis of a determination whether or not congestion notification packets received from the node have been continuously received during at least a given period and a determination whether or not a quantity of memory used in a buffer memory which accumulates second received packets at the switch is at least a given value; and
a memory managing section configured to delete, in a case where the node is determined to be in the failure state, data addressed to the node in the failure state among data accumulated in the buffer memory.

2. The switch according to claim 1, further comprising:
a port controlling section configured to set, in a case where the node is determined to be in the failure state, a port which is connected to the node in the failure state, into a link-down state.

3. The switch according to claim 1,
wherein the buffer memory is a shared buffer memory configured to accumulate packets received on each of a plurality of ports.

4. The switch according to claim 1,
wherein the congestion notification packets are pause packets.

5. A switch controlling method comprising:
determining whether or not a node is in a failure state in which first received packets at the node cannot be successfully processed, on a basis of a determination whether or not congestion notification packets received from the node have been continuously received during at least a given period and a determination whether or not a quantity of memory used in a buffer memory which accumulates second received packets at the switch is at least a given value; and
deleting, in a case where the node is determined to be in the failure state, data addressed to the node in the failure state among data accumulated in the buffer memory.

6. The switch controlling method according to claim 5, further comprising:
setting, in a case where the node is determined to be in the failure state, a port which is connected to the node in the failure state, into a link-down state.

7. The switch controlling method according to claim 5,
wherein the buffer memory is a shared buffer memory configured to accumulate packets received at each of a plurality of ports.

8. A non-transitory computer-readable recording medium storing thereon a program being configured to make a computer equipped in a switch to execute:
a process of determining whether or not a node is in a failure state in which first received packets at the node cannot be successfully processed, on a basis of a determination whether or not congestion notification packets received from the node have been continuously received during at least a given period and a determination whether or not a quantity of memory used in a buffer memory which accumulates second received packets at the switch is at least a given value; and
a process of deleting, in a case where the node is determined to be in the failure state, data addressed to the node in the failure state among data accumulated in the buffer memory.

9. The non-transitory computer-readable recording medium according to claim 8, configured to further make the computer to execute:
a process of setting, in a case where the node is determined to be in the failure state, a port which is connected to the node in the failure state, into a link-down state.

10. The non-transitory computer-readable recording medium according to claim 8,
wherein the buffer memory is a shared buffer memory configured to accumulate packets received at each of a plurality of ports.

* * * * *